(12) United States Patent
Miyazaki et al.

(10) Patent No.: US 8,266,782 B2
(45) Date of Patent: Sep. 18, 2012

(54) METHOD OF JOINING MEMBERS TOGETHER

(75) Inventors: Masahiro Miyazaki, Oyama (JP); Yasuji Kawamata, Oyama (JP)

(73) Assignee: Showa Denko K.K., Tokyo (JP)

( * ) Notice: Subject to any disclaimer, the term of this patent is extended or adjusted under 35 U.S.C. 154(b) by 1009 days.

(21) Appl. No.: 12/297,154

(22) PCT Filed: Apr. 12, 2007

(86) PCT No.: PCT/JP2007/058052
§ 371 (c)(1),
(2), (4) Date: Oct. 14, 2008

(87) PCT Pub. No.: WO2007/119777
PCT Pub. Date: Oct. 25, 2007

(65) Prior Publication Data
US 2009/0277523 A1  Nov. 12, 2009

(30) Foreign Application Priority Data
Apr. 13, 2006  (JP) .................................. 2006-111087

(51) Int. Cl.
*B21D 39/00* (2006.01)
*F16L 3/00* (2006.01)
(52) U.S. Cl. .......................................... 29/523; 138/106
(58) Field of Classification Search .................... 29/505, 29/523, 283.5, 523.1, 524, 428, 890.044, 29/890.043; 403/230; 138/106, 115
See application file for complete search history.

(56) References Cited

U.S. PATENT DOCUMENTS
2009/0139089 A1* 6/2009 Miyazaki et al. ........ 29/890.044

FOREIGN PATENT DOCUMENTS

| EP | 709641 A2 | 5/1996 |
| JP | 42-13391 | 7/1967 |
| JP | 62-1385 | 1/1987 |
| JP | 04-008818 | 1/1992 |
| JP | 10-118729 | 5/1998 |
| JP | 11 036859 | 2/1999 |
| JP | 2002-224743 | 8/2002 |

OTHER PUBLICATIONS

Japanese International Search Report, dated Jul. 17, 2007.
Japanese Written Opinion dated Jul. 17, 2007.
Extended European Search Report dated Apr. 1, 2010, issued in corresponding European Patent Application No. 07741488.

* cited by examiner

*Primary Examiner* — John C Hong
(74) *Attorney, Agent, or Firm* — Westerman, Hattori, Daniels & Adrian, LLP

(57) ABSTRACT

A joining method for joining a second member to a first which is a tubular member having a plurality of hollow portions partitioned by a partition wall portion is provided. The first member 1 is inserted into an insertion hole 6 formed in the second member 5. A die segment 11a of a die 11 and a wedge portion segment 19a of a mandrel 18 are disposed in each hollow portion 3 of the first member 1. Next, in a state in which the partition wall portion 4 is held by and between both wedge portion segments 19a and 19a, each wedge portion segment 18a is inserted into the corresponding wedge hole portion segment 14a of the die segment 11a to thereby move each die segment 11 of the die 11 radially outward of the first member 1. With this, the inserted portion 2a of the first member 1 inserted in the insertion hole 6 and both portions 2b and 2b axially adjacent to the inserted portion are expanded to thereby join the first member 1 and the second member 5.

14 Claims, 12 Drawing Sheets

US 8,266,782 B2

METHOD OF JOINING MEMBERS TOGETHER

The present application is a U.S. National Stage filing of PCT/JP2007/058052, and claims priority to said PCT application and Japanese Patent Application No. 2006-111087 filed on Apr. 13, 2006, the entire contents of which applications are incorporated herein by reference.

TECHNICAL FIELD

The present invention relates to a joining method and a joining device for joining a tubular first member having an axially extended partition wall portion and a plurality of hollow portions partitioned by the partition wall portion to a second member.

BACKGROUND ART

Conventionally, as a method of joining a pipe and another member, for example, the following method is used.

A pipe is inserted into an insertion hole formed in another member and an expansion die having a wedge hole portion and circumferentially divided centering on the wedge hole portion into a plurality of segments is disposed in the hollow portion of the pipe. Next, the wedge portion of the mandrel is inserted into the wedge hole portion of the die to thereby move each segment of the die in the radially outward direction of the pipe. With this, the inserted portion of the pipe inserted into the insertion hole and the portions axially adjacent to the inserted portion are pushed outwardly by the die segments to execute the expansion work (tube diameter expansion work) to thereby join another member to the pipe. (see, e.g., Patent Documents 1 and 2). This method is called a ridge lock method.

Although it is not a joining method for members, as an expansion method for a circular cylindrical member using a die, there is known a method described in Japanese Unexamined Laid-open Patent Publication No. 2002-224743, for example. (see, Patent Document 3).

Patent Document 1: Japanese Unexamined Laid-open Patent Publication No. H4-8818 (page 2, FIG. 8)
Patent Document 2: Japanese Unexamined Laid-open Patent Publication No. H11-36859
Patent Document 3: Japanese Unexamined Laid-open Patent Publication No. 2002-224743

DISCLOSURE OF THE INVENTION

Problems to be Solved by the Invention

In a joined structure obtained by a conventional joining method, there is a drawback that a pile easily bends when a bending load is applied to the pipe.

Therefore, the present inventors conceived to use a pipe with an axially extended partition wall portion to improve the bending strength of the pipe. In that case, however, the partition wall portion of the pipe is likely bent at the time of the expansion work. As a result, there is a drawback that the bending strength cannot be increased.

The present invention was made in view of the aforementioned technical background, and the purpose of the invention is to provide a joining method for joining a tubular first member, such as a pipe, having a partition wall portion to a second member, a joined structure obtained by the joining method, and a joining device for use in the joining method.

The other purposes and advantages of the present invention will be apparent from the following preferred embodiments.

Means to Solve the Problems

The present invention provides the following means.

[1] A joining method for joining a first member and a second member, wherein, using the first member which is a tubular member having an axially extended partition wall portion and a plurality of hollow portions partitioned by the partition wall portion and the second member having an insertion hole into which the first member is to be inserted, in a state in which the first member is inserted into the insertion hole of the second member, an expansion work of an inserted portion of the first member inserted in the insertion hole and both portions of the first member axially adjacent to the inserted portion is executed to thereby join the first member and the second member, characterized in that using a mandrel having a wedge portion divided into a plurality of wedge portion segments centering on the wedge portion, and a die having a wedge hole portion corresponding to the wedge portion of the mandrel and divided into a plurality of die segments in a circumferential direction centering on the wedge hole portion, in each hollow portion of the first member, the die segments of the die and the wedge portion segments of the mandrel are disposed, and then, in a state in which the partition wall portion is held by and between the wedge portion segments disposed in the two adjacent hollow portions via the partition wall portion of the first member, each wedge portion segment is simultaneously inserted into the wedge hole portion segment of the corresponding die segment to move each die segment radially outward of the first member to thereby execute the expansion work.

[2] The joining method for joining members as recited in the aforementioned Item 1, wherein the first member is a tubular member polygonal in cross-section, and wherein the insertion hole of the second member is formed into a cross-sectional shape corresponding to a cross-section shape of the first member.

[3] The joining method for joining members as recited in the aforementioned Item 1, wherein the first member is a tubular member quadrilateral in cross-section and its widthwise middle portions of at least a pair of opposing flat wall portions among four flat wall portions of the first member are connected by the partition wall portion, and wherein the die is divided at a position corresponding to the widthwise middle portion of each flat wall portion of the first member, and wherein the insertion hole of the second member is formed into a cross-sectional shape corresponding to a cross-sectional shape of the first member, and wherein each die segment is moved radially outward of the first member toward each corner portion of the first member to execute the expansion work.

[4] The joining method for joining members as recited in the aforementioned Item 2 or 3, wherein a corner portion of the first member is formed into a generally circular arc shape in cross-section.

[5] The joining method for joining members as recited in any one of the aforementioned Items 1 to 4, wherein the die has, on its outer peripheral surface, two protruded portions for outwardly locally expanding both portions of the first member axially adjacent to the inserted portion of the first member inserted in the insertion hole.

[6] The joining method for joining members as recited in any one of the aforementioned Items 1 to 5, wherein the second member is, on its circumferential edge portion of the insertion hole, integrally provided with a plate portion protruded in an axial direction of the first member, and wherein the expansion work is executed in a state in which the plate portion of the second member is disposed on the outer peripheral surface of the first member in a fitted manner and a restraining member disposed on an outer surface side of the plate portion prevents the plate portion from rolling up from the outer peripheral surface of the first member.

[7] The joined structure obtained by the joining method as recited in any one of the aforementioned Items 1 to 6.

[8] A joined structure in which a first member which is a tubular member having an axially extended partition wall portion and a plurality of hollow portions partitioned by the partition wall portion and a second member having an insertion hole into which the first member is to be inserted are joined, characterized in that in a state in which the first member is inserted into the insertion hole of the second member, an expansion work of an inserted portion of the first member inserted in the insertion hole and both portions of the first member axially adjacent to the inserted portion is executed, whereby the first member and the second member are joined.

[9] The joined structure as recited in the aforementioned Item 8, wherein the first member is a tubular member polygonal in cross-section, and wherein the insertion hole of the second member is formed into a cross-sectional shape corresponding to a cross-section shape of the first member.

[10] The joined structure as recited in the aforementioned Item 8, wherein the first member is a tubular member quadrilateral in cross-section and its widthwise middle portions of at least a pair of opposing flat wall portions among four flat wall portions of the first member are connected by the partition wall portion, wherein a cross-sectional shape of the insertion hole of the second member is formed into a cross-sectional shape corresponding to a cross-section shape of the first member, and wherein at least each corner portion of the inserted portion of the first member inserted in the insertion hole and both portions of the first member axially adjacent to the inserted portion are expanded.

[11] The joined structure for members as recited in the aforementioned Items 9 or 10, wherein a corner portion of the first member is formed into a generally circular arc shape in cross-section.

[12] The joined structure for members as recited in any one the aforementioned Items 8 to 11, wherein both portions of the first member axially adjacent to the inserted portion of the first member inserted in the insertion hole are expanded locally outward.

[13] The joined structure for members as recited in any one of the aforementioned Items 8 to 12, wherein a peripheral edge portion of the insertion hole of the second member is integrally provided with a plate portion protruded in an axial direction of the first member, and wherein, in a state in which the plate portion of the second member is disposed on an outer peripheral surface of the first member in a fitted manner, an annular restraining member for preventing the plate portion from rolling up from an outer peripheral surface of the first member is outwardly fitted on outer surface side of the plate portion

[14] A joining device for joining a first member which is a tubular member having an axially extended partition wall portion and a plurality of hollow portions partitioned by the partition wall portion and a second member having an insertion hole by expanding an inserted portion of the first member inserted in the insertion hole of the second member and both portions of the first member adjacent to the inserted portion of the first member in a state in which the first member is inserted into the insertion hole of the second member, the joining device comprises:

an expanding mandrel having a wedge portion circumferentially divided into a plurality of wedge portion segments centering on the wedge portion; and an expanding die having a wedge portion hole corresponding to the wedge portion of the mandrel, the die circumferentially being divided into a plurality of die segments centering on the wedge hole portion, wherein each die segment of the die is configured to be disposed in each hole portion of the first member, and wherein the wedge portion segments of the mandrel are configured to be inserted into the wedge portion hole segments of the die segments disposed in the first member to move the die segments radially outward of the first member.

[15] The joining device as recited in the aforementioned Item 14, wherein the die has, on its outer peripheral surface, two protruded portions for outwardly locally expanding both portions of the first member axially adjacent to the inserted portion of the first member inserted in the insertion hole.

Effects of the Invention

The present invention exerts the following effects.

In this specification, in the joined structure in which the second member is joined to the first member, the joint strength of the second member against a load in the circumferential direction of the first member will be referred to as "twisting strength". Further, the joint strength of the second member against a load in the axial direction of the first member will be referred to as "pull out strength".

In the invention [1], the first member is a tubular member having an axially extended partition wall portion and a plurality of hollow portions partitioned by the partition wall portion. Therefore, the joined structure can be reduced in weight, and the bending strength of the joined structure (the first member) can be improved.

Furthermore, at the time of the expansion work, the partition wall portion of the first member is held by and between the wedge portion segments of the mandrel, so opposing pressing forces are applied to each partition wall portion from both wedge portion segments, which cancels the pressing forces. This prevents bending of the partition wall portion which may occur at the time of the expansion work. This in turn can improve the bending strength of the joined structure (the first member) assuredly.

In the invention [2], the first member 1 is a tubular member polygonal in cross-section, and the insertion hole of the second member is formed into a cross-sectional shape corresponding the cross-sectional shape of the first member. Therefore, the twisting force can be improved in a state in which the first member is inserted into the insertion hole of the second member. Accordingly, even if a load in the circumferential direction of the first member is applied to the second member, the second member will not be easily moved in the circumferential direction of the first member.

In the invention [3], the same effects as in the invention [2] can be attained. Furthermore, since each die segment of the die is moved toward each corner portion of the first member radially outward of the first member to thereby execute the expansion work, each corner portion of the first member is more expanded than each flat wall portion of the first member and largely expanded outward. Therefore, the twisting strength can be further increased.

According to the invention [4], the corner portion of the first member is formed into a generally circular arc cross-sectional shape. Thus, when a load in the circumferential direction of the first member is applied to the second member, the stress concentration on the corner portion of the first member can be assuredly prevented. This improves the strength dependability.

In the invention [5], on the outer peripheral surface of the die, two protruded portions for locally outwardly expanding both portions of the first member axially adjacent to the inserted portion of the first member are formed. Therefore, by executing the expansion work using the die, both portions of the first member axially adjacent to the inserted portion can be expanded locally outward. As a result, the pull out strength can be improved assuredly. Therefore, even if a load in the axial direction of the first member is applied to the second member, the second member is not easily be moved in the axial direction of the first member.

In the invention [6], by disposing the plate portion of the second member on the outer peripheral surface of the first member in a fitted manner, the contact area of the second member and the first member increases. This further improves the bonding strength. Furthermore, the contact area of the second and the first member is increased not by increasing the thickness of the second member but by providing a plate portion at a circumferential edge portion of the insertion hole of the second member, and therefore the joined structure can be reduced in weight.

Furthermore, by executing the expansion work in a state in which the plate portion of the second member is prevented from rolling up from the outer peripheral surface of the first member by a restraining member disposed on the outer peripheral surface of the plate portion, the plate portion can be assuredly brought into surface-to-surface contact with the outer peripheral surface of the first member, which in turn can assuredly improve the joint strength.

In the invention [7], a joined structure with high bending strength can be provided.

In the inventions [8] to [13], the same effects as those of the inventions [1] to [6] can be exerted.

In the inventions [14] and [15], a joining device suitably used for the joining method for members according to the present invention can be provided.

DESCRIPTION OF REFERENCE NUMERALS

Figure 1:
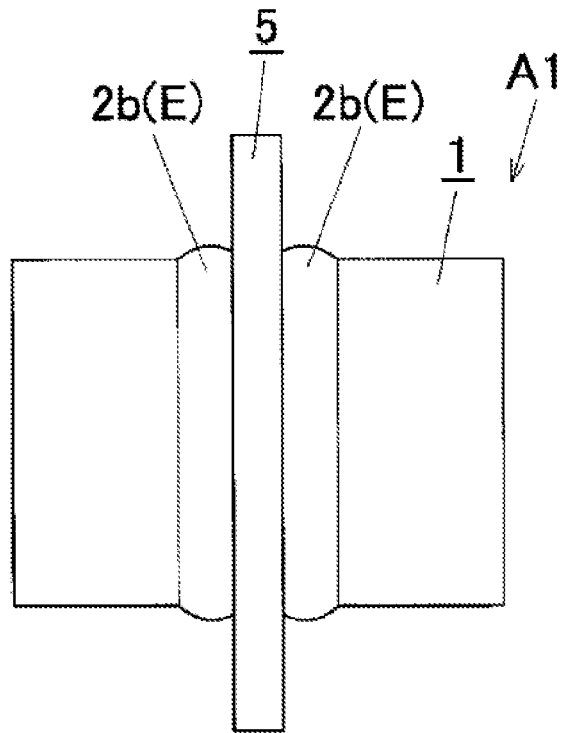
FIG. 1 is a side view of a joined structure according to a first embodiment of the present invention.

A1 to A7 . . . joined structure
1 . . . first member
1a . . . flat wall portion
1b . . . corner portion
2a . . . inserted portion
2b . . . portion adjacent to the inserted portion
3 . . . hollow portion
4 . . . partition wall portion
5 . . . second member
6 . . . insertion hole
8 . . . plate portion
10 . . . joining device
11 . . . die
11a . . . die segment
12 . . . protruded portion
14 . . . wedge hole portion
14a . . . wedge hole portion segment
18 . . . mandrel
18a . . . mandrel segment
19 . . . wedge portion
19a . . . wedge portion segment
30 . . . restraining member

BEST MODE FOR CARRYING OUT THE INVENTION

Next, some preferred embodiments of the present invention is explained along with the drawings.

FIGS. 1 to 9 show a joining method and a joining device for members according to a first embodiment of the present invention.

Figure 2:
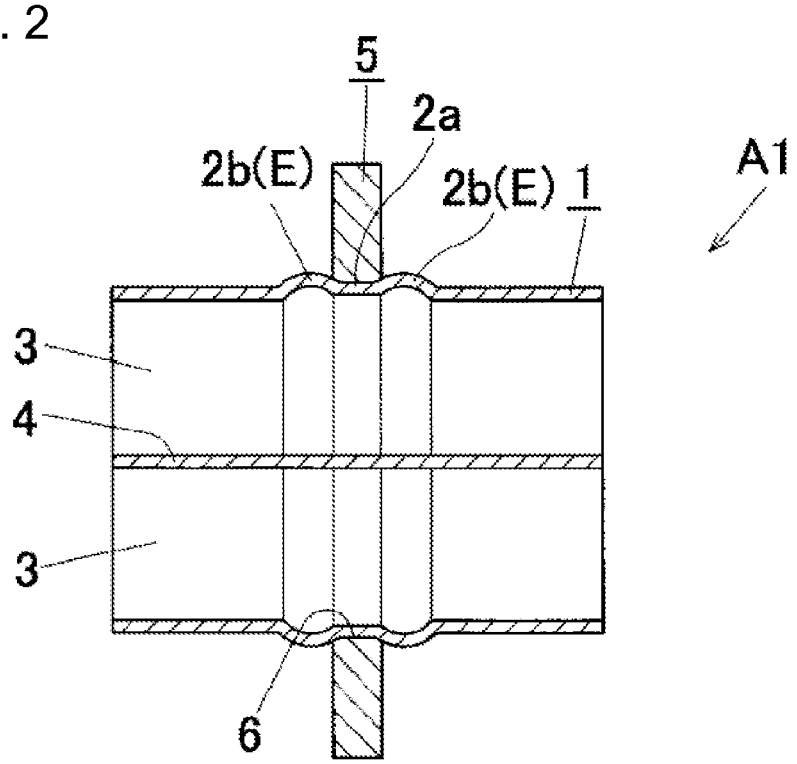
FIG. 2 is a cross-sectional view of the joined structure.

In FIGS. 1 and 2, "A1" denotes a joined structure produced by a joining method for members according of the first embodiment. The joined structure A1 is made by joining a first member 1 and a second member 5.

Figure 3:
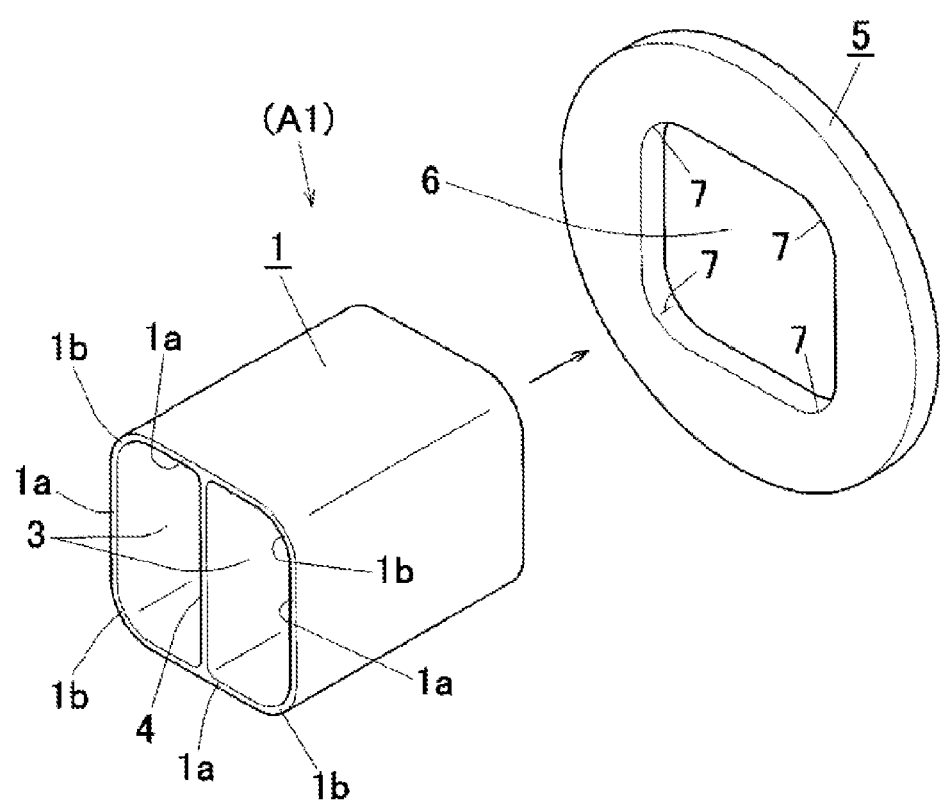
FIG. 3 is a perspective view of the first and second members.

The first member 1, as shown in FIG. 3, is an angular tubular member quadrilateral in cross-section (more specifically, square in cross-section), and includes, in its inner portion, one axially extended flat-plate shaped partition wall portion 4 and two axially extended hollow portions 3 and 3 quadrilateral in cross-section which are partitioned by the partition wall portion 4. The partition wall portion 4 and the two hollow portions 3 and 3 are positioned inside the first member 1. The structure of the first member 1 will be explained as follows.

The first member 1 has an outer peripheral surface quadrilateral in cross-section, and includes four circumferentially arranged flat wall portions 1a, 1a, 1a and 1a and corner portions 1b each placed between adjacent two flat wall portions 1a and 1a. The cross-section of each corner portion 1b is formed into a circular arc shape having a prescribed curvature radius. Also, the partition wall portion 4 has an I-shaped cross-section. In a pair of opposing flat wall portions 1a and 1a among the four flat wall portions 1a, 1a, 1a and 1a of the first member 1, one widthwise end portion of the partition wall portion 4 is integrally joined to a widthwise middle portion of the flat wall portions 1a, and the other widthwise end portion of the partition wall portion 4 is integrally joined to a widthwise middle portion of the other flat wall portion 1a. Thus, the widthwise middle portions of the pair of opposing flat wall portions 1a and 1a are joined by the partition wall portion 4. Therefore, the first member 1 has a generally "日"-shaped cross-section. Furthermore, the bending strength of the first member 1 is increased by the partition wall portion 4.

The first member 1 is made of plastic deformable material, such as, e.g., metal, and more specifically aluminum or aluminum alloy. In the present invention, however, the material for the first member 1 is not limited to aluminum and aluminum alloy, and can be, for example, metal, such as, e.g., iron, steel or copper. In addition, the first member 1 is an extruded member for example. In the present invention, however, the first member 1 can be any member made by any other methods.

The second member 5 is a plate-like member, and more specifically a circular disc-shaped member. Furthermore, in the center portion of the second member 5, an insertion hole 6 is provided into which the first member 1 is to be inserted. This cross-section of the insertion hole 6 is formed into a cross-sectional shape corresponding to the cross-section shape of the first member 1 (more specifically, the cross-section of the outer peripheral surface of the first member 1), i.e., a quadrilateral shape. As mentioned above, since the cross-sectional shape of each corner portion 1b of the first member 1 is formed into a circular arc shape, the cross-sectional shape of each corner portion 7 of the insertion hole 6 of the second member 5 is formed into a circular arc shape corresponding to the cross-sectional shape of each corner portion 1b of the first member 1.

The second member 5 has a rigidity, and is made of, for example, metal, more specifically aluminum or aluminum alloy. In the present invention, however, the material for the second member 5 is not limited to aluminum and aluminum alloy and can be, for example, metal, such as, e.g., iron, steel, or copper, and can be ceramic or plastic.

The length of the first member 1 is set so as to fall within the range of, for example, from 50 to 2,000 mm. The length of each side of the first member 1 in cross-section is set so as to fall within the range of, for example, from 20 to 100 mm. The curvature radius of each of the corner portions 1b of the first member 1 is set so as to fall within the range of, for example, from 5 to 45 mm. The thickness of the peripheral wall portion of the first member 1, i.e., the thickness of the flat wall portion 1a and that of the corner portion 1b, is set so as to fall within the range of, for example, from 0.5 to 5 mm. The thickness of the partition wall portion 4 is set so as to fall within the range of, for example, from 0.5 to 5 mm.

In the present invention, however, it is not required that each size of the first member 1 and its partition wall portion 4 is set so as to fall within the aforementioned range, and each size can be set arbitrarily depending on the intended purpose and/or the intended use.

The diameter of the second member 5 is set so as to fall within the range of, for example, from 35 to 300 mm. The length of each side of the insertion hole 6 of the second member 5 is set so as to be longer than the length of each side of the first member 1 in cross-section by, for example, 0.5 to 5 mm. The curvature radius of each corner portion 7 of the insertion hole 6 of the second member 5 is set so as to fall within the range of, for example, from 5 to 45 mm. The thickness of the second member 5 is set so as to fall within the range of, for example, from 1 to 50 mm.

In the present invention, however, it is not required that each size of the second member 5 is set so as to fall within the aforementioned ranges, and each size can be set arbitrarily depending on the intended purpose and/or the intended use.

In the joined structure A1, as shown in FIG. 2, in a state in which the first member 1 is inserted into the insertion hole 6 of the second member 5, the inserted portion 2a of the first member 1 inserted in the insertion hole 6 of the second member 5 and both portions 2b and 2b of the first member 1 axially adjacent to the inserted portion 2a are subjected to expansion work (tube diameter expansion work) as expansion work scheduled portions. Thus, the first member 1 and the second member 5 are joined.

The inserted portion 2a of the first member 1 inserted in the insertion hole 6 is slightly expanded outward. Furthermore, both portions 2b and 2b axially adjacent to the inserted portion 2a of the first member 1 inserted in the insertion hole 6 are locally expanded outward in a circular arc shape in cross-section, and the second member 5 is held by and between both the portions 2b and 2b. "E" is an expanded portion of the portion 2b.

The expansion height of the expanded portion E of each of the portions 2b and 2b axially adjacent to the inserted portion 2a of the first member 1 inserted in the insertion hole 6 is set so as to fall within the range of, for example, from 0.5 to 10 mm, and the width of the expanded portion E is set so as to fall within the range of, for example, from 3 to 30 mm. In the present invention, however, it is not required that the expansion height of the expanded portion E and the width thereof are set so as to fall within the aforementioned ranges.

In this joined structure A1, the second member 5 is used as, for example, a flange to be mounted on another member. In this case, typically, a joining member insertion hole (not shown), such as, e.g., a bolt insertion hole, is formed in the second member 5. In the present invention, however, the second member 5 is not limited to be used as a flange, but can be used as a member having, for example, a bracket or a stay.

Next, a joining device 10 for joining the first member 1 and the second member 5 according to a first embodiment of the present invention will be explained.

Figure 4:
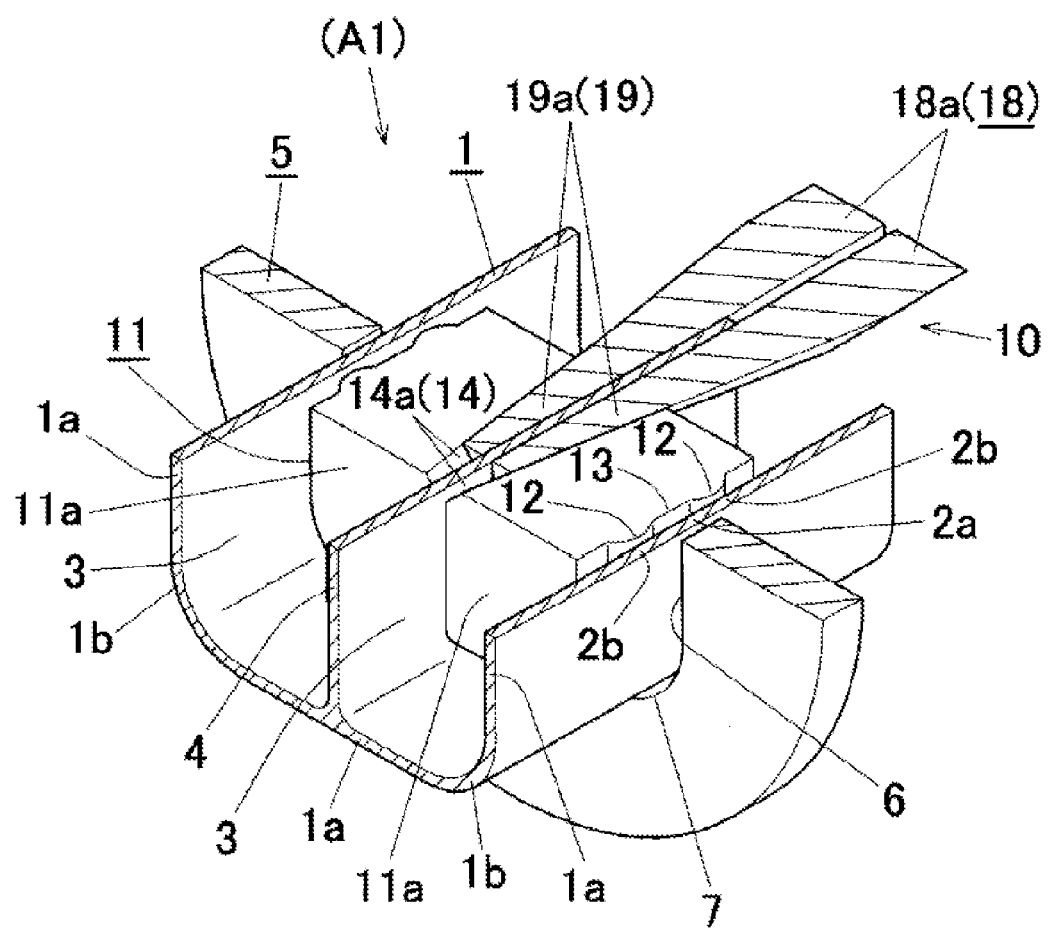
FIG. 4 is a half cross-sectional perspective view of a given portion of the first member in a state before executing expansion work.
Figure 5:
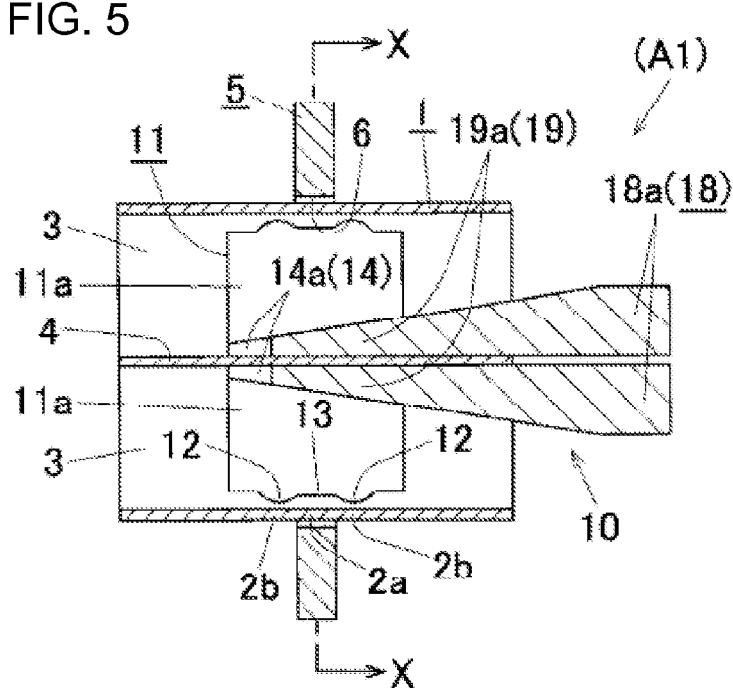
FIG. 5 is a cross-sectional view of a given portion of the first member in a state before executing expansion work.
Figure 6:
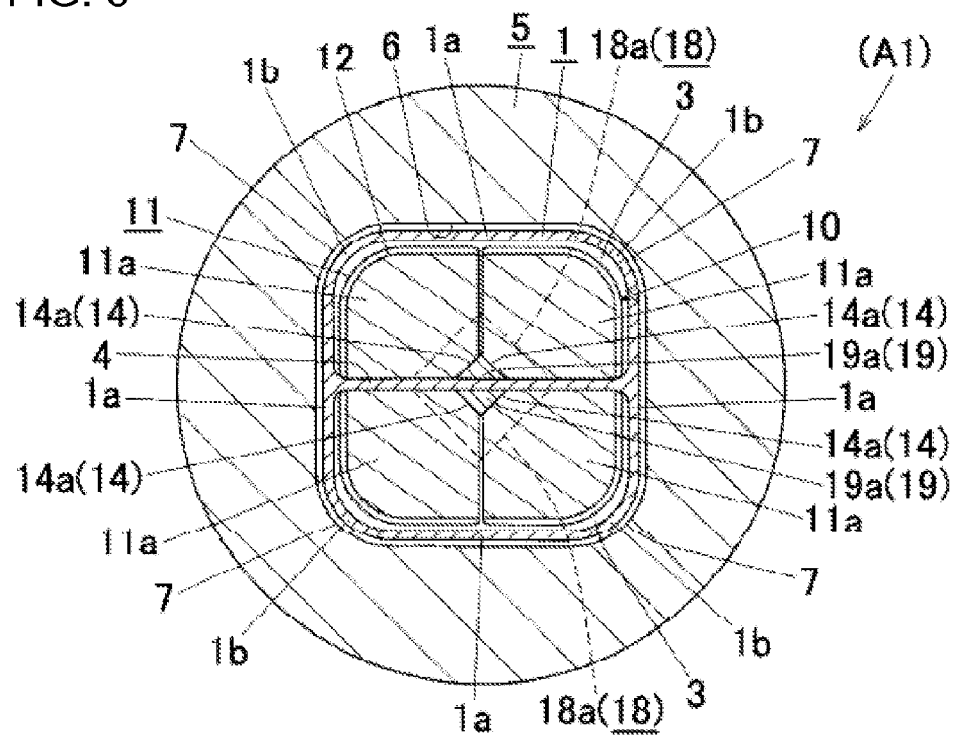
FIG. 6 is a cross-sectional view taken along the line X-X in FIG. 5.

As shown in FIGS. 4 to 6, the joining device 10 is equipped with an expansion die 11 and a mandrel 18.

The mandrel 18 has a wedge portion 19 made of, for example, tool steel or hard metal. The wedge portion 19 is formed integrally on the tip portion of the mandrel 18 in a tapered quadrangular pyramid (or quadrangular cone) shape. Also, at the basal end portion of the mandrel 18, a driving source (not illustrated) for moving the mandrel 18 (more specifically, the wedge portion 19 of the mandrel 18) in its axial direction is attached. For the driving source, for example, a fluid pressure cylinder, such as, e.g., a hydraulic cylinder, is used.

Furthermore, the mandrel 18 is divided into a plurality of segments in the circumferential direction centering on the wedge portion 19. The division number of the mandrel 18 is the same as the number of the hollow portions 3 of the first member 1, i.e., two. Therefore, the mandrel 18 is formed by combining two mandrel segments 18a and 18a, and the wedge portion 19 of the mandrel 18 is formed by combining two wedge portion segments 19a and 19a.

The die 11 is configured to be disposed in the hollow portions 3 and 3 of the first member 1, and as shown in FIG. 6, and has a cross-sectional shape corresponding to the cross-sectional shape of the inner periphery of the first member 1, i.e., a square shape in cross-section. The die 11 is made of, for example, tool steel or hard metal. At the center portion of the die 11, a wedge hole portion 14 corresponding to the wedge portion 19 of the mandrel 18 is penetrated in the axial direction of the die 11. Furthermore, the die 11 is divided into four segments centering on the wedge hole portion 14. More specifically, the die 11 is divided at positions each corresponding to the widthwise middle portion of each flat wall portion 1a of the first member 1 centering on the wedge hole portion 19. The division number of the die 11 is the same as the number of the corner portions 1b of the first member 1. Thus, the die 11 is formed by combining the four die segments 11a, 11a, 11a and 11a, and the wedge hole portion 14 of the die 11 is formed by combining the four wedge hole portion segments 14a, 14a, 14a, and 14a.

As shown in FIGS. 4 and 5, the die 11 has, at the axially intermediate portion of the outer peripheral surface, two protruded portions 12 and 12 which are apart from each other in the axial direction and extended along the entire circumference. Both the protruded portions 12 and 12 are used to locally outwardly expand both portions 2b and 2b axially adjacent to the inserted portion 2a of the first member 1 inserted in the insertion hole 6 into a circular arc shape in cross-section.

Furthermore, in this die 11, the diameter of the portion 13 located between both the protruded portions 12 and 12 is set to be larger than the diameter of each of both the axial end portions of the die 11. This portion 13 is used to outwardly locally expand the inserted portion 2a of the first member 1 inserted in the insertion hole 6.

As shown in FIG. 6, two of the die segments 11a and 11a among the four die segments 11a, 11a, 11a, and 11a are disposed in one of the two hollow portions 3 and 3 of the first member 1, and the two remaining die segments 11a and 11a are disposed in the other hollow portion 3 of the first member 1.

The wedge portion segments 19a of the mandrel 18 are configured to be inserted into the wedge hole portion segments 14a of the two die segments 11a and 11a disposed inside each hollow portion 3 of the first member 1 to thereby move each die segment 11a toward each corner portion 1b of the first member 1 radially outward of the first member 1. With this movement of the die segment 11, the inserted portion 2a of the first member 1 inserted in the insertion hole 6 and both portions 2b and 2b axially adjacent to the inserted portion are pushed outward by the die segment 11a.

In the present invention, the wedge portion 19 of the mandrel 18 and the wedge hole portion 14 of the die 11 can be formed into any cross-sectional shape that can cause each die segment 11a of the die 11 to move in a direction radially outward of the first member 1 in accordance with the insertion operation of the wedge portion 19 into the wedge hole portion 14. The concrete examples of the cross-sectional shape of the wedge portion 19 includes a polygonal shape, such as, e.g., a quadrilateral shape, a pentagonal shape, a hexagonal shape, a heptagonal shape, or an octagonal shape, and a similar shape as the cross-section of the first member 1 or its hollow portion 3.

Next, the joining method for joining the first member 1 and the second member 5 using the aforementioned joining device 10 will be explained.

As shown in FIGS. 4 to 6, initially, the first member 1 is inserted into the insertion hole 6 of the second member 5 in a loosely inserted manner. Furthermore, at a position in each hollow portion 3 of the first member 1 corresponding to the second member 5, two die segments 11a of the die 11 are inserted and disposed. Furthermore, in each hollow portion 3 of the first member 1, one wedge portion segment 19a of the mandrel segment 18a of the mandrel 18 is disposed.

Figure 7:
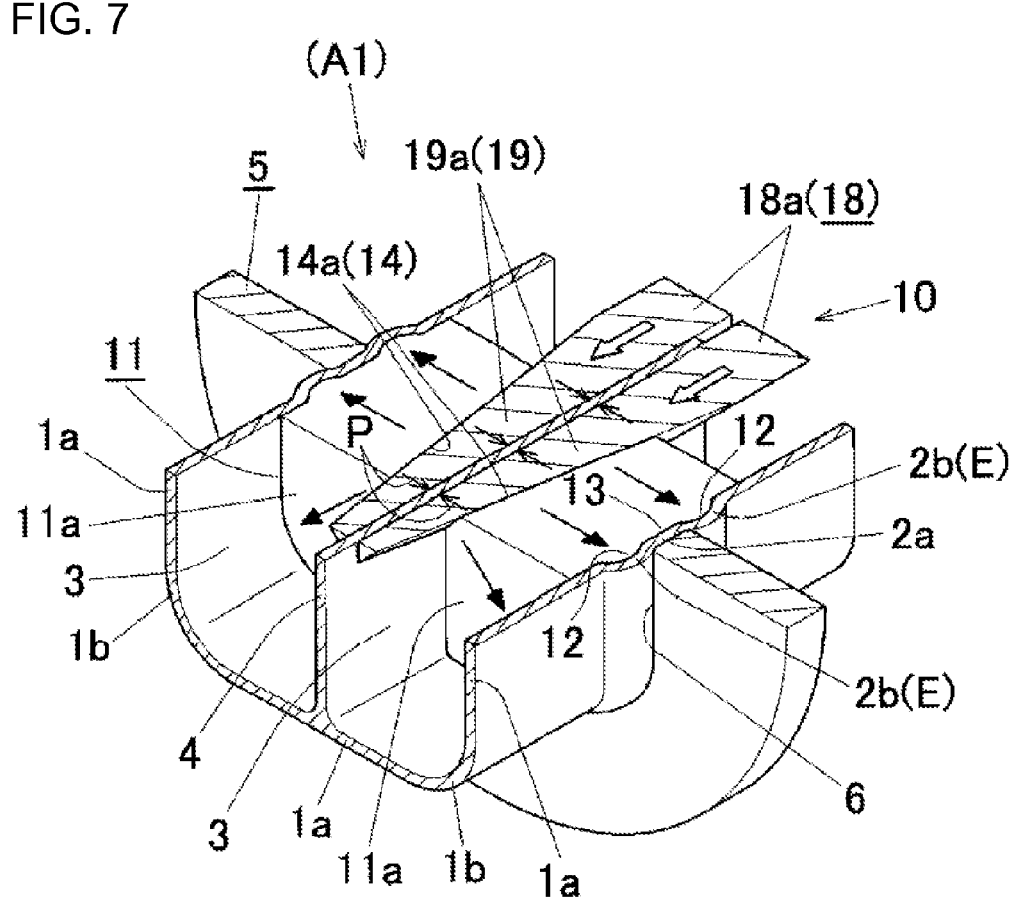
FIG. 7 is a half cross-sectional perspective view of a given portion of the first member in a state after executing expansion work.
Figure 8:
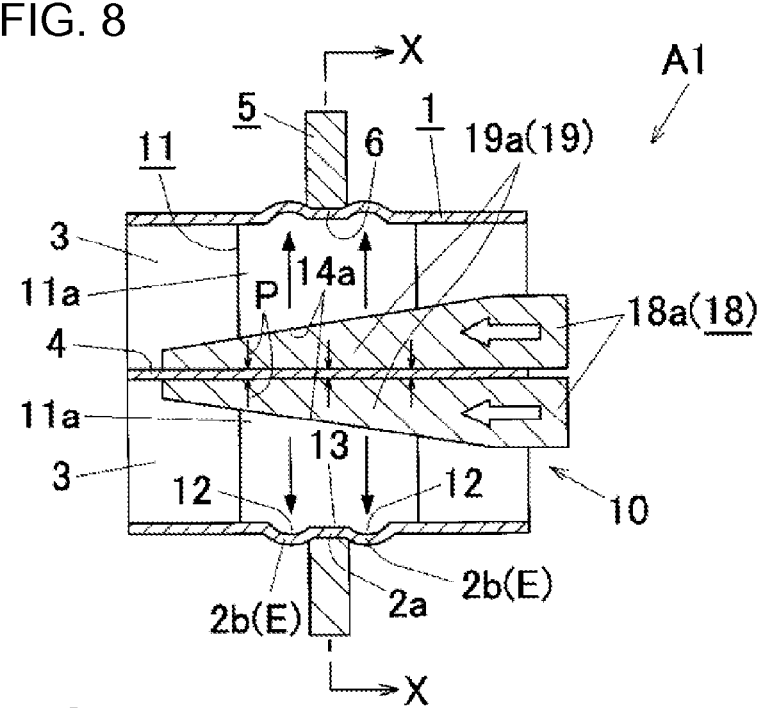
FIG. 8 is a cross-sectional view of a given portion of the first member in a state after executing expansion work.
Figure 9:
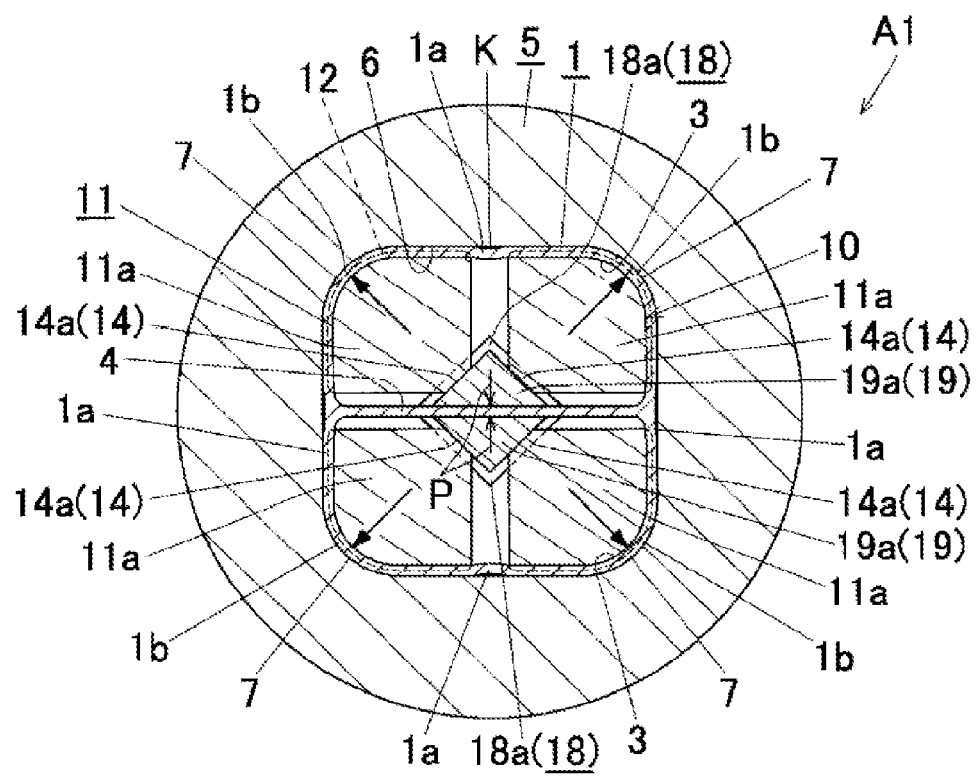
FIG. 9 is a cross-sectional view taken along the line X-X in FIG. 8.

Next, as shown in FIGS. 7 to 9, in a state in which the partition wall portion 4 is held by and between the wedge portion segments 19a and 19a disposed in the adjacent two opposing hollow portions 3 and 3 via the partition wall portion 4 of the first member 1, the wedge portion segments 19a and 19a are simultaneously moved in the axial direction of the first member 1 to simultaneously insert each wedge portion segment 19a into the corresponding wedge hole portion segment 14a of the die segment 11a. As a result, each die segment 11a is moved radially outward of the first member 1 toward each corner portion 1b of the first member 1 to thereby simultaneously execute the expansion work (tube diameter expansion work) of the inserted portion 2a of the first member 1 inserted in the insertion hole 6 and both portions 2b and 2b axially adjacent to the inserted portion 2a.

With this expansion work, the inserted portion 2a of the first member 1 inserted in the insertion hole 6 and both portions 2b and 2b axially adjacent to the inserted portion 2a are outwardly locally expanded and plastically deformed to be pressurized against the peripheral edge portion of the insertion hole 6 of the second member 5 and that the second member 5 is elastically deformed so that the insertion hole 6 of the second member 5 is extended radially outward. As the second member 5 is elastically deformed, the elastic restoring force is stored in the second member 5.

Next, both the wedge portion segments 19a and 19a of the mandrel 18 are simultaneously removed from the wedge hole portion segments 14a. As a result, the elastic restoring force (spring back force) stored in the second member 5 causes the second member 5 to be pressurized against and fixed to the outer peripheral surface of the first member 1. As a result, the second member 5 is joined to the first member 1 (and more specifically, the outer peripheral surface of the first member 1).

As mentioned above, the die 11 is divided at a position corresponding to the widthwise middle portion of each flat wall portion 1a of the first member 1, so that, when executing the expansion work, each die segment 11a of the die 11 moves toward each corner portion 1b of the first member 1. Consequently, with this expansion work, among the inserted portion 2a of the first member 1 inserted in the insertion hole 6 and both portions 2b and 2b axially adjacent to the inserted portion 2a, especially each corner portion 1b of the inserted portion 2a and each corner portion 1b of both portions 2b and 2b axially adjacent to the inserted portion 2a are largely and certainly expanded outward. As a result, the second member 5 is firmly fixed to the first member 1.

The joining method of the first embodiment has the following advantages.

The first member 1 is a tubular member having an axially extended partition wall portion 4 and two hollow portions 3 and 3 partitioned by the partition wall portion 4, so the joined structure A1 can be decreased in weight, and furthermore, the bending strength of the joined structure A1 (first member 1) can be increased.

Furthermore, at the time of executing the expansion work, since the partition wall portion 4 of the first member 1 is held by and between the wedge portion segments 19a and 19a of the mandrel 18, opposing welding pressure P and P applied to the partition wall portion 4 from both wedge portion segments 19a and 19a will be cancelled each other. This prevents bending of the partition wall portion 4 which may occur at the time of the expansion work. Therefore, the partition wall portion 4 assuredly increases the bending strength of the joined structure A1 (first member 1).

The first member 1 is a tubular member quadrilateral in cross-section and the insertion hole 6 of the second member 5 is formed into a cross-sectional shape corresponding the cross-sectional shape of the first member 1, so in a state in which the first member 1 is inserted in the insertion hole 6 of the second member 5, the twisting strength can be improved. Therefore, even if a load in the circumferential direction of the first member 1 is applied to the second member 5, the second member 5 will not be easily moved in the circumferential direction of the first member 1.

Furthermore, since the expansion work is performed by moving each die segment 11a of the die 11 disposed in the hollow portion 3 of the first member 1 radially outward of the first member 1 toward each corner portion 1b, each corner portion 1b of the first member 1 is more expanded than each flat wall portion 1a of the first member 1 and largely expanded outward. This further increases the twisting strength. As shown in FIG. 9, even if a gap K is formed between the flat wall portion 1a of the first member 1 and the second member 5, sufficient twisting strength can be secured against the load in the circumferential direction of the first member 1.

Furthermore, since each corner portion 1b of the first member 1 is formed into a circular arc cross-sectional shape, in cases where a load in the circumferential direction of the first member 1 is applied to the second member 5, the stress concentration on each corner portion 1b of the first member 1 can be assuredly prevented. This improves the strength dependability.

Also, on the outer peripheral surface of the die 11, two protruded portions 12 and 12 for outwardly expanding both portions 2b and 2b of the first member 1 axially adjacent to the inserted portion 2a of the first member 1 inserted in the insertion hole 6 are formed. Therefore, by executing the expansion work using the die 11, both portions 2b and 2b of the first member 1 axially adjacent to the inserted portion 2a of the first member 1 inserted in the insertion hole 6 will be locally and assuredly expanded outward. This assuredly improves the pull out strength. Therefore, even if a load in the axial direction of the first member 1 is applied to the second member 5, the second member 5 will not be easily moved in the axial direction of the first member 1.

Figure 10:
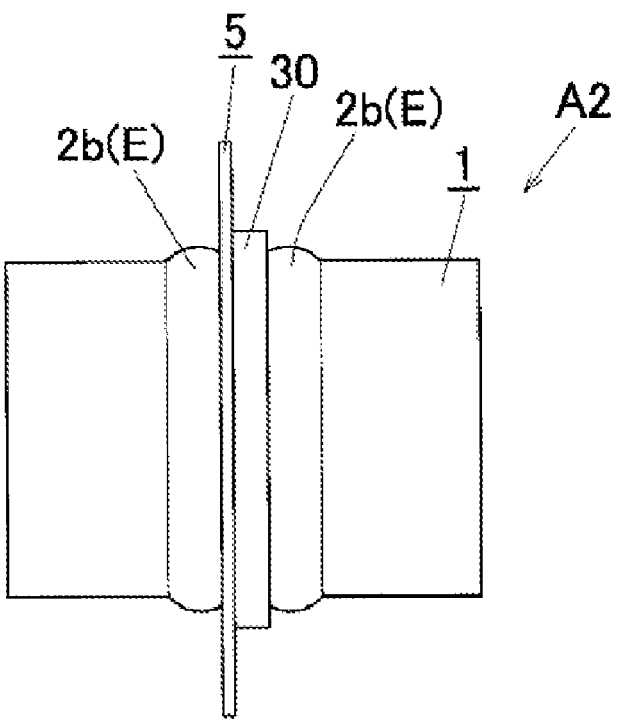
FIG. 10 is a side view of a joined structure according to a second embodiment of the present invention.
Figure 11:
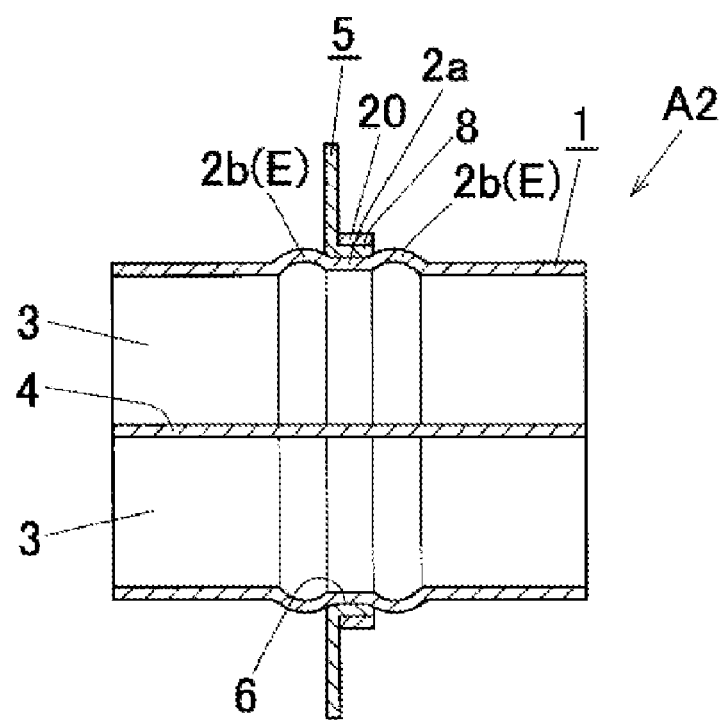
FIG. 11 is a cross-sectional view of the joined structure.

FIGS. 10 and 11 are explanatory views for explaining a joined structure A2 according to a second embodiment of the present invention. In these figures, the same reference numerals are allotted to the same elements as those of the joined structure A1 of the aforementioned first embodiment. The following explanation will be directed to the structure of the joined structure A2 of the second embodiment while focusing on the portions different from the joined structure A1 of the first embodiment.

In this joined structure A2, as shown in FIG. 11, on the peripheral edge portion of the insertion hole 6 of the second member 5, a generally angular short cylindrical shaped plate portion 8 protruding in the axial direction of the first member 1 (i.e., the thickness direction of the second member 5) is integrally formed along the entire periphery. The plate portion 8 is formed by bending the peripheral edge portion of the insertion hole 6 of the second member 5 into a generally angular short cylindrical shape along the entire periphery. The plate portion 8 is configured to be fitted to the outer peripheral surface of the first member 1 in a state in which the second member 5 is attached to the first member 1.

The thickness of the second member 5 and that of the plate portion 8 are set so as to fall within the same range of, for example, from 0.5 to 10 mm. Also, the protruded length of the plate portion 8 is set so as to fall within the range of, for example, from 1 to 50 mm. In the present invention, however, each size of the second member 5 and that of the plate portion 8 are not limited to be within the aforementioned ranges.

"30" denotes an annular restraining member. The restraining member 30 is configured to prevent the plate portion 8 of the second member 5 fitted to the outer peripheral surface of the first member 1 from rolling up from the outer peripheral surface of the first member 1. In this embodiment, the restraining member 30 is an angular annular member.

The restraining member 30 is a member having a rigidity and made of, for example, metal, and more specifically, aluminum or aluminum alloy. In the present invention, however, the material for the restraining member 30 is not limited to aluminum or aluminum alloy, and can be other metal, such as, e.g., iron, steel, or copper, and it can also be ceramic or plastic.

The length of each cross-sectional side of the hollow portion of the restraining member 30 is set to, for example, 0.5 to 5 mm longer than the length of each cross-sectional side of the plate portion 8 of the second member 5. The width of the restraining member 30 (i.e., the length of the restraining member 30 along the axial direction of the first member 1) is set so as to fall within the range of, for example, from 0.5 to 1 times the protruded length of the plate portion 8 of the second member 5. The thickness of the restraining member 30 is set to the thickness that the restraining member 30 can withstand the load to be applied to the restraining member 30 at the time of the expansion work. For example, the thickness is set so as to fall within the range of, for example, from 1 to 10 mm. In the present invention, however, each size of the restraining member 30 is not limited to be within the aforementioned ranges.

In this joined structure A2, the second member 5 is joined to the first member 1 by executing the expansion work of the inserted portion 2a of the first member 1 inserted in the insertion hole 6 of the second member 5 and both portions 2b and 2b of the first member 1 axially adjacent to the inserted portion 2a of the first member 1 in a state in which the first member 1 is inserted into the insertion hole 6 of the second member 5 and that the plate portion 8 of the second member 5 is fitted to the outer peripheral surface of the first member 1. Furthermore, the restraining member 30 is fixed to the outer surface of the plate portion 8 in a pressed manner by the elastic restoring force stored at the time of the expansion work. With this, the restraining member 30 is attached to the plate portion 8 in an outwardly fitted manner.

Now, the joining method for joining the first member 1 and the second member 5 according to the second embodiment will be explained while focusing on the differences from the joining method of the aforementioned first embodiment.

The first member 1 is inserted into the insertion hole 6 of the second member 5, and the plate portion 8 of the second member 5 is disposed on the outer peripheral surface of the first member 1 in a fitted manner. In this state, there is a slight gap between the plate portion 8 of the second member 5 and the first member 1. Furthermore, the plate portion 8 of the second member 5 is inserted into the hollow portion of the restraining member 30, so that the restraining member 30 is disposed on the outer surface side of the plate portion 8 so as to surround the plate portion 8. In this state, the plate portion 8 is restrained by the restraining member 30 so that it does not accidentally roll up from the outer peripheral surface of the first member 1 at the time of the expansion work. Also, there is a slight gap between the plate portion 8 and the restraining member 30.

Next, in this state, in the same manner as in the joining method of the first embodiment, using the joining device 10 of the first embodiment, the inserted portion 2a of the first member 1 inserted in the insertion hole 6 and both portions 2b and 2b axially adjacent to the inserted portion 2a are simultaneously expanded. As a result, the second member 5 is joined to the first member 1, and further the restraining member 30 is secured to the outer surface of the plate portion 8 of the second member 5 in an outwardly fitted manner. At the time of this expansion work, the plate portion 8 of the second member 5 is restrained by the restraining member 30 so that it won't accidentally roll up from the outer peripheral surface of the first member 1.

The joining method of the second embodiment has the following advantages.

By disposing the plate portion 8 of the second member 5 on the outer peripheral surface of the first member 1 in a fitted manner, the contact area between the second member 5 and the first member 1 increases, which further improves the joint strength. Furthermore, the increase of the contact area between the first member 1 and the second member 5 is accomplished not by increasing the thickness of the second member 5 but by providing the plate portion 8 on the peripheral edge portion of the insertion hole 6 of the second member 5. Therefore, the joined structure A2 can be decreased in weight.

Furthermore, by executing the expansion work in a state in which the restraining member 30 controls the plate portion 8 of the second member 5 so that it won't roll up from the outer peripheral surface of the first member 1, the plate portion 8 can be assuredly brought into contact with the outer peripheral surface of the first member 1 in a surface-to-surface contact manner, resulting in assured improvement of the joint strength.

Figure 12:
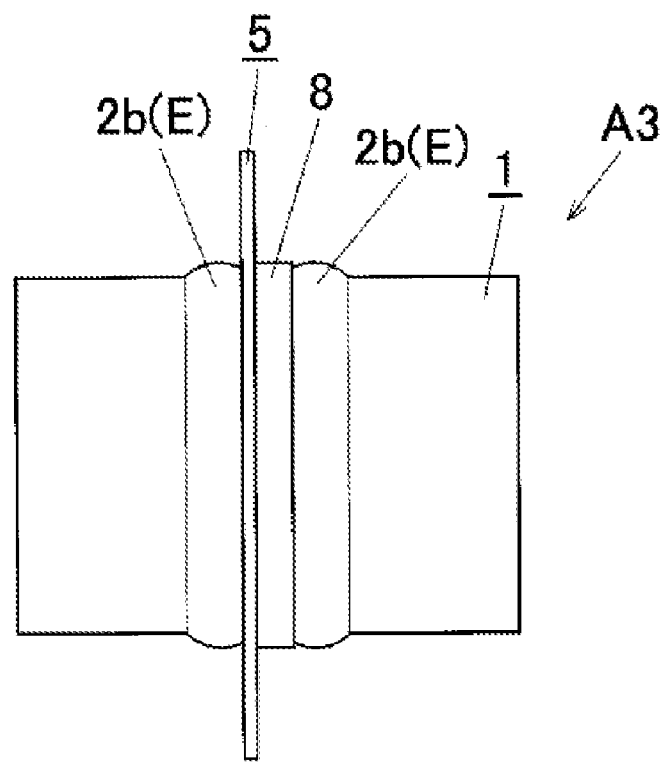
FIG. 12 is a side view of a joined structure according to a third embodiment of the present invention.
Figure 13:
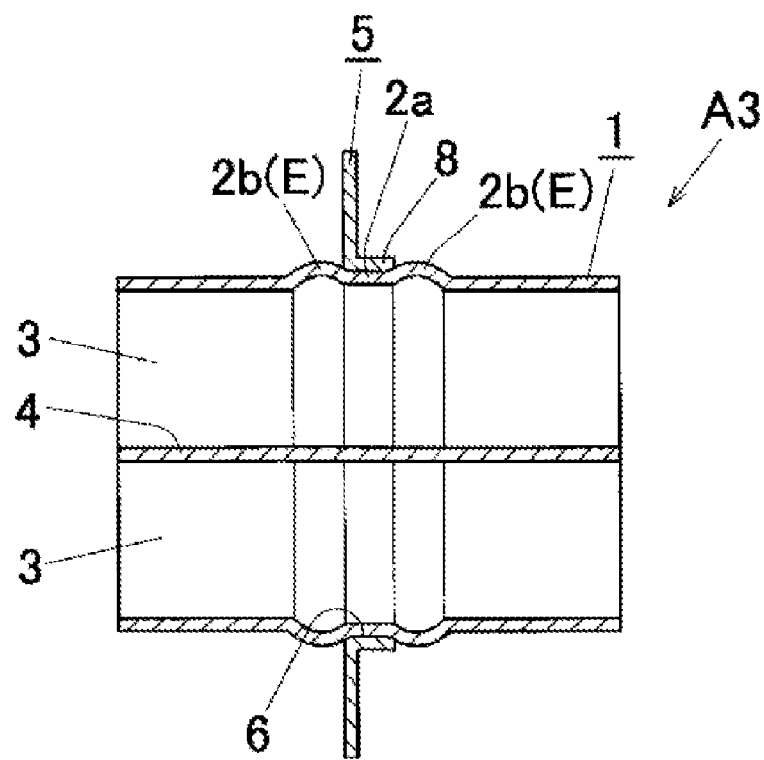
FIG. 13 is a cross-sectional view of the joined structure.

FIGS. 12 and 13 are explanatory views for explaining a joined structure A3 according to a third embodiment of the present invention. In these figures, the same reference numerals are allotted to the same elements as those in the joined structures A1 and A2 of the aforementioned first and second embodiments. The joined structure A3 of the third embodiment is a structure in which the restraining member 30 in the joined structure A2 of the second embodiment is removed after the expansion work.

In this joined structure A3, since the restraining member 30 has been removed, the further weight reduction of the joined structure A3 has been attained.

In the present invention, the restraining member 30 can be formed into an annular shape divided into a plurality of segments in the circumferential direction, or it can be formed into a non-annular shape.

Figure 14:
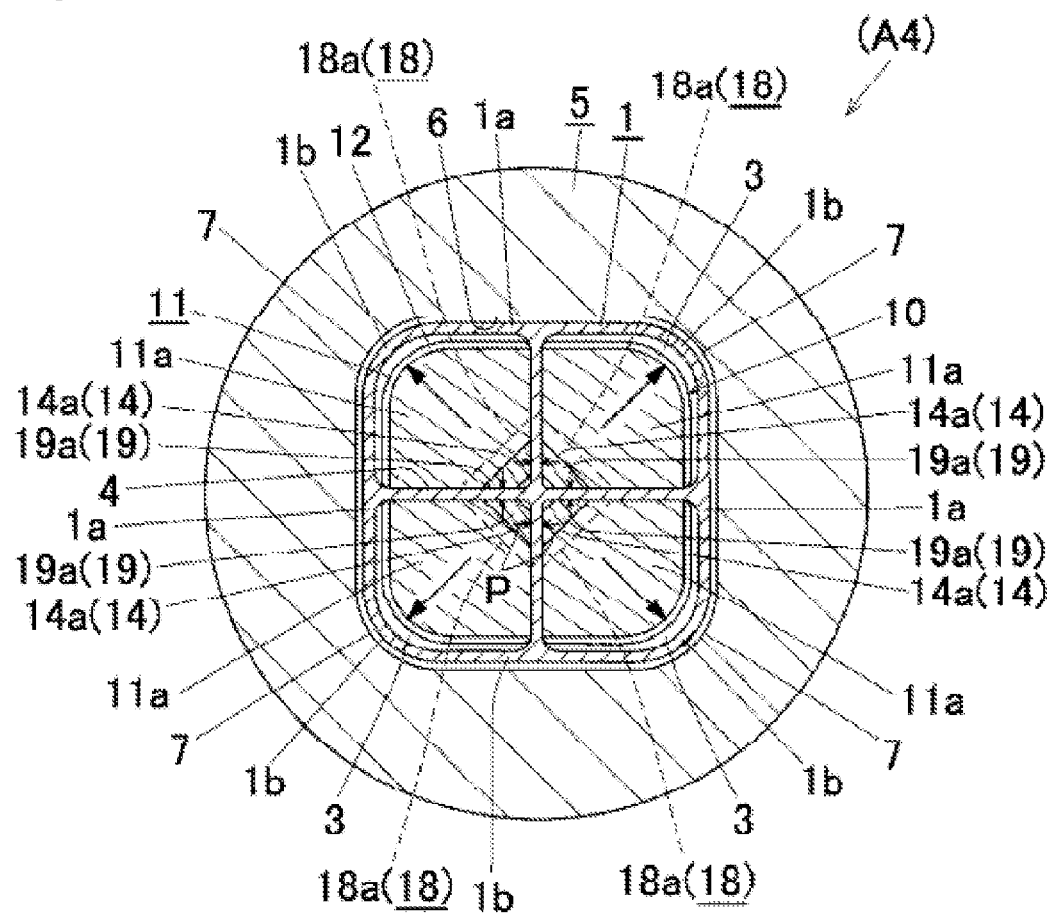
FIG. 14 is a cross-sectional view of a joined structure according to a fourth embodiment of the present invention in a state before expanding a given portion of the first member.

FIG. 14 is an explanatory view for explaining a joining method for joining members according to a fourth embodiment of the present invention. In this figure, the same reference numerals are allotted to the same elements as those in the members of the joined structure A1 of the aforementioned first embodiment. The joining method of the fourth embodiment will be explained while focusing on the points different from the aforementioned first embodiment.

In this fourth embodiment, the first member 1 is a tubular member quadrilateral in cross-section having, in its inner portion, an axially extended partition wall portion 4 having a cross-shape (or + (plus) shape) in cross-section and four hollow portions 3, 3, 3, and 3 quadrilateral in cross-section partitioned by the partition wall portion 4. The structure of the first member 1 will be explained as follows.

In this the first member 1, among the two pairs of opposing flat wall portions, the widthwise middle portions of a pair of opposing flat wall portions 1a and 1a and the widthwise middle portions of the other pair of flat wall portions 1a and 1a are connected by the partition wall portion 4 having a cross-shape in cross-section. Therefore, the entire cross-sectional shape of the first member 1 is formed into a generally ⊞-shape. The partition wall portion 4 is integrally formed with the first member 1.

The mandrel 18 of this joining device 10 used for the joining method is divided into four segments in the peripheral direction centering on the wedge portion 19. Therefore, the mandrel 18 is formed by combining four mandrel segments 18a, 18a, 18a and 18a, and the wedge portion 19 of the mandrel 18 is formed by combining four wedge portion segments 19a, 19a, 19a and 19a. The die 11 is divided into four segments in the same manner as in the die of the joining device 10 of the aforementioned first embodiment.

Next, the joining method of the fourth embodiment will be explained.

First, the first member 1 is inserted into the insertion hole 6 of the second member 5 in a loosely fitted manner. And, at a position of the first member 1 corresponding to the second member 5 in each hollow portion 3 of the first member 1, the die segment 11a of the die 11 is inserted and disposed one by one. Then, the wedge portion segment 19a of the mandrel segment 18a of the mandrel 18 is disposed one by one in each hollow portion 3 of the first member 1.

Next, as shown in the figure, in a state in which the partition wall portion 4 is held by and between the wedge portion segments 19a and 19a disposed in two adjacent hollow portions 3 and 3 via the partition wall portion 4 of the first member 1, the wedge portion segments 19a, 19a, 19a, and 19a are simultaneously moved in the axial direction of the first member 1 to thereby simultaneously insert each wedge portion segment 19a into the corresponding wedge hole portion segment 14a of the die segment 11a. With this operation, each die segment 11a of the die 11 is moved radially outward of the first member 1 toward each corner portion 1b to thereby simultaneously expand the inserted portion 2a of the first member 1 inserted in the insertion hole 6 and both portions 2b and 2b axially adjacent to the inserted portion 2a. The other steps are the same as those of the joining method of the aforementioned first embodiment.

According to the joined structure A4 obtained by joining the first member 1 and the second member 5, the first member 1 is a tubular member having an axially extended partition wall portion 4 having a cross-shape in cross-section. Therefore, the bending strength of the joined structure A4 (first member 1) can be further increased.

Furthermore, the expansion work is performed by moving each die segment 11a of the die 11 radially outward of the first member 1 toward each corner portion 1b of the first member 1. Therefore, each corner portion 1b of the first member 1 is intensively expanded more than each flat wall portion 1a and largely expanded outward. Therefore, the twisting strength can be further increased.

Figure 15:
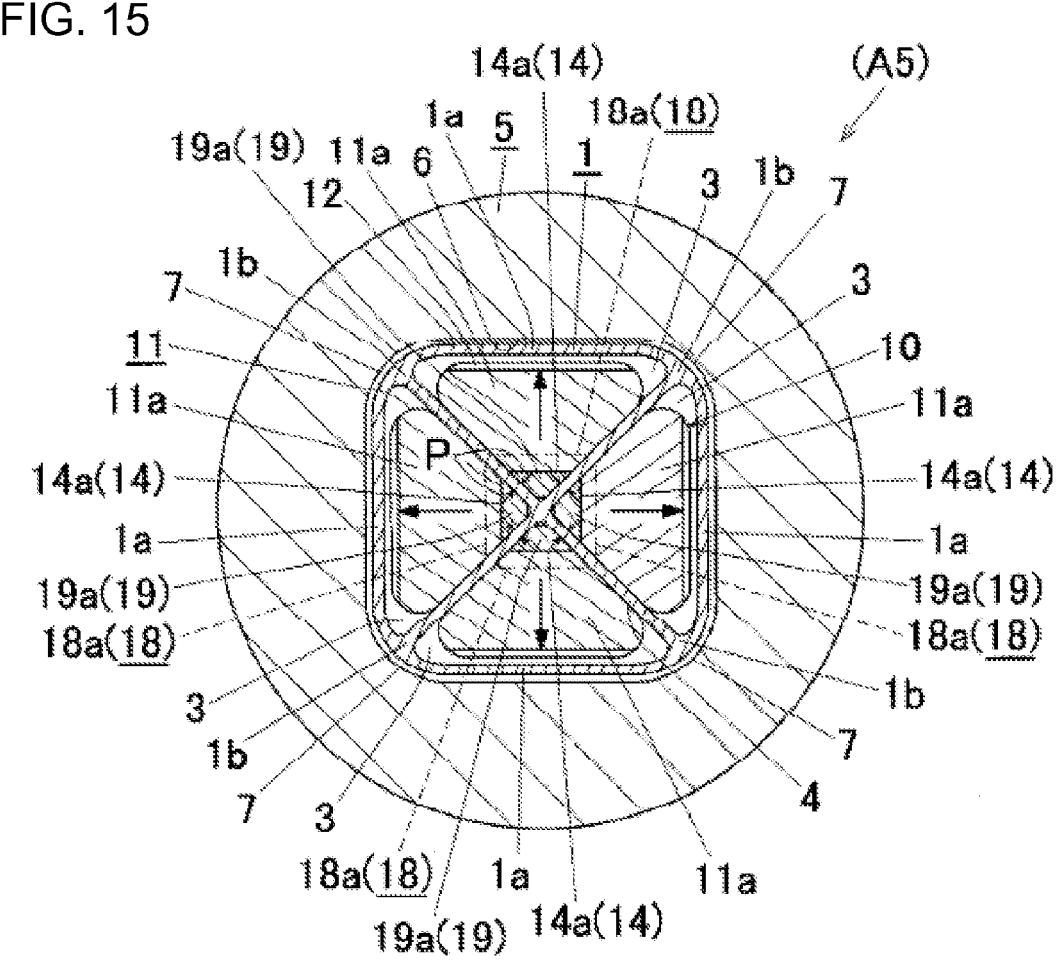
FIG. 15 is a cross-sectional view of a joined structure according to a fifth embodiment of the present invention before expanding a given portion of the first member.

FIG. 15 is an explanatory view for explaining the joining method for members according to a fifth embodiment of the present invention. In this figure, the reference numerals are allotted to the same elements as those in the joined structure A1 of the aforementioned first embodiment. The joining method of the fifth embodiment will be explained while focusing the points different from the aforementioned first embodiment.

In this fifth embodiment, the first member 1 is an angular tube member quadrilateral in cross-section provided, in its inner portion, with an axially extended partition wall portion 4 having an X-shape in cross-section and four hollow portions 3, 3, 3, and 3 triangular in cross-section and partitioned by the partition wall portion 4. The structure of the first member 1 will be detailed as follows.

In the first member 1, among the two pairs of opposing corner portions, a pair of opposing corner portions 1b and 1b and another pair of opposing corner portions 1b and 1b are connected by the partition wall portion 4 having an X-shape in cross-section. Also, the partition wall portion 4 is integrally formed with the first member 1.

The mandrel 18 of the joining device 10 used for this joining method is divided into four segments centering on the wedge portion 19. Thus, the mandrel 18 is formed by combining four mandrel segments 18a, 18a, 18a, and 18a. The wedge portion 19 of the mandrel 18 is formed by combining four wedge portion segments 19a, 19a, 19a, and 19a. The die 11 is divided into four segments at a position corresponding to each corner portion 1b of the first member 1 centering on the wedge hole portion 14.

Next, the joining method of the fifth embodiment will be explained.

First, the first member 1 is inserted into the insertion hole 6 of the second member 5 in a loosely fitted manner. Also, at a position of each hollow portion 3 of the first member 1 corresponding to the second member 5, a die segment 11a of the die 11 is inserted one by one. Furthermore, in each hollow portion 3 of the first member 1, the wedge portion segment 19a of the mandrel segment 18a of the mandrel 18 is disposed one by one.

Next, as shown in the figure, in a state in which the partition wall portion 4 is held by and between the wedge portion segments 19a and 19a disposed in two adjacent hollow portions 3 and 3 via the partition wall portion 4 of the first member 1, the wedge portion segments 19a, 19a, 19a, and 19a are simultaneously moved in the axial direction of the first member 1 to thereby simultaneously insert each wedge portion segments 19a into the wedge hole portion segment 14a of the corresponding die segment 11a. With this, each die segment 11a of the die 11 is moved radially outward of the first member 1 toward each flat wall portion 1a of the first member 1 to thereby simultaneously execute the expansion work of the inserted portion 2a of the first member 1 inserted in the insertion hole 6 and both portions 2b and 2b axially adjacent to the inserted portion 2a. The other steps are the same as those of the joining method of the aforementioned first embodiment.

According to the joined structure A5 obtained by joining the first member 1 and the second member 5 as mentioned above, since the first member 1 is a tubular member provided with an axially extended partition wall portion 4 having an X-cross-sectional shape, the bending strength of the joined structure A5 (the first member 1) can be further improved.

Figure 16:
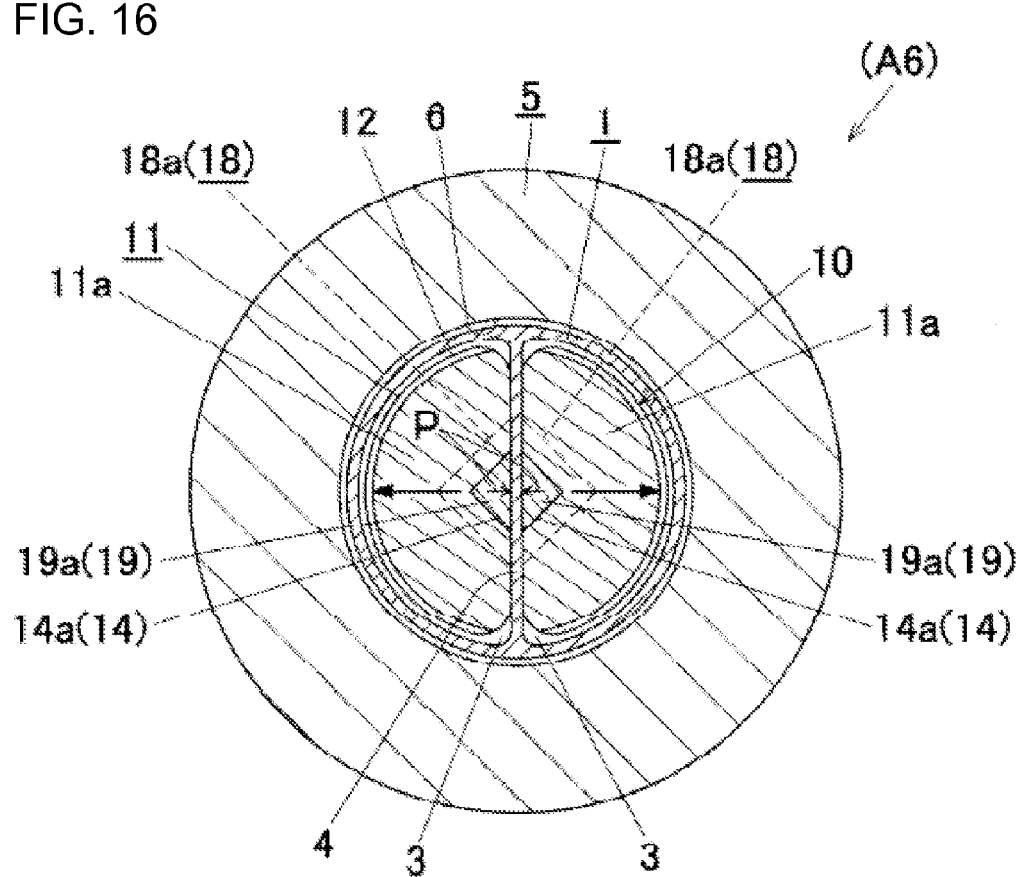
FIG. 16 is a cross-sectional view of a joined structure according to a sixth embodiment of the present invention before expanding a given portion of the first member.

FIG. 16 is an explanatory view for explaining the joining method for members according to a sixth embodiment of the present invention. In this figure, the same reference numerals are allotted to the same elements as those in the joined structure A1 of the aforementioned first embodiment. The joining method of the sixth embodiment will be explained while focusing on the points different from the joined structure A1 of the first embodiment.

In this sixth embodiment, the first member 1 is a tubular member circular in cross-section and provided, in its inner portion, with an axially extended partition wall portion 4 having an I-cross-sectional shape and two hollow portions 3 and 3 semicircular in cross-section and partitioned by the partition wall portion 4. The structure of the first member 1 will be detailed as follows.

In this first member 1, a pair of opposing portions of its circumferential wall portion is connected by the partition wall portion 4 having a I-cross-sectional shape. Also, the partition wall portion 4 is integrally formed with the first member 1.

The mandrel 18 of the joining device 10 used for this joining method is circumferentially divided into two segments centering on the wedge portion 19. Therefore, the mandrel 18 is formed by combining two mandrel segments 18a and 18a, and the wedge portion 19 of the mandrel 18 is formed by combining two wedge portion segments 19a and 19a. The die 11 is circumferentially divided into two segments centering on the wedge hole portion 14.

Next, the joining method of the sixth embodiment will be explained.

First, the first member 1 is inserted into the insertion hole 6 of the second member 5 in a loosely fitted manner. Further, at a position of each hollow portion 3 of the first member 1 corresponding to the second member 5, a die segment 11a of the die 11 is inserted one by one. Furthermore, in each hollow portion 3 of the first member 1, the wedge portion segment 19a of the mandrel segment 18a of the mandrel 18 is disposed one by one.

Next, as shown in the figure, in a state in which the partition wall portion 4 is held by and between the wedge portion segments 19a and 19a disposed in two adjacent hollow portions 3 and 3 via the partition wall portion 4 of the first member 1, the wedge portion segments 19a and 19a are simultaneously moved in the axial direction of the first member 1 to thereby simultaneously insert each wedge portion segments 19a into the wedge hole portion segment 14a of the corresponding die segment 11a. As a result, each die segment 11a of the die 11 is moved radially outward of the first member 1 to thereby simultaneously execute the expansion work of the inserted portion 2a of the first member 1 inserted in the insertion hole 6 and both portions 2b and 2b axially adjacent to the inserted portion 2a. The other steps are the same as those of the joining method of the aforementioned first embodiment.

With the aforementioned steps, the joined structure A6 of the sixth embodiment is obtained.

Figure 17:
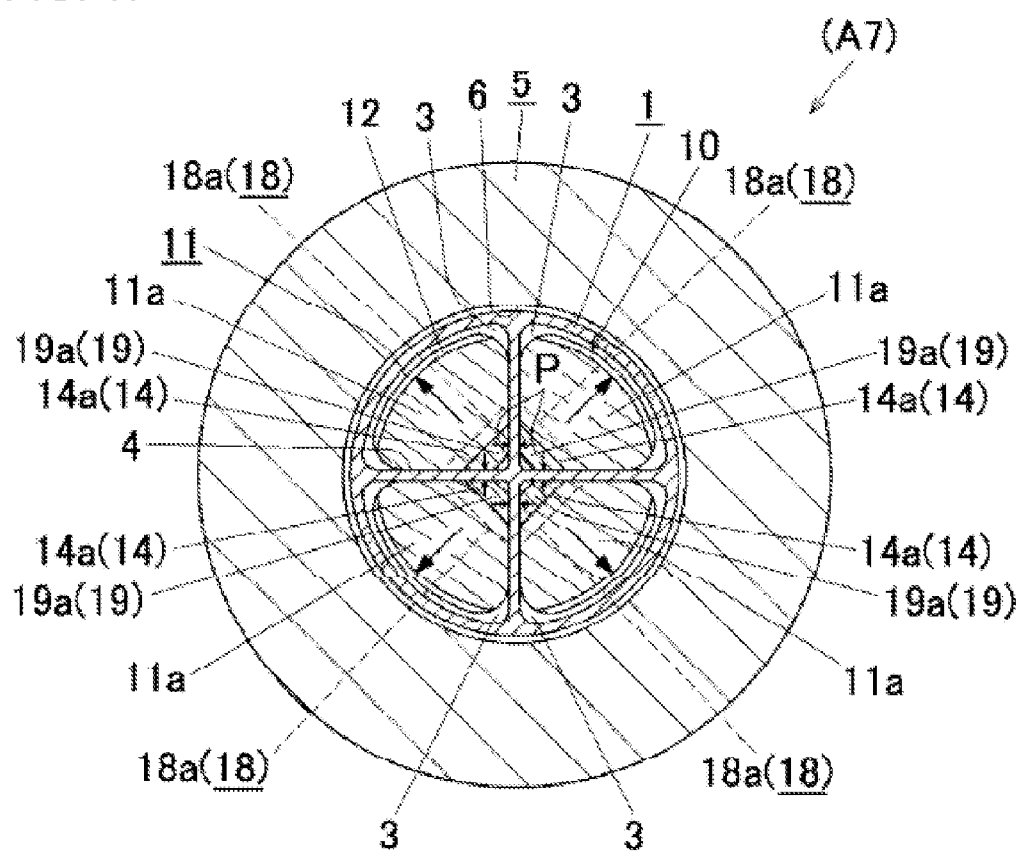
FIG. 17 is a cross-sectional view of a joined structure according to a seventh embodiment of the present invention before expanding a given portion of the first member.

FIG. 17 is an explanatory view for explaining the joining method for joining members according to a seventh embodiment of the present invention. In this figure, the same reference numerals are allotted to the same elements as those of the joined structure A1 of the aforementioned first embodiment. The joining method of the seventh embodiment will be explained while focusing on the points different from the joined structure A1 of the first embodiment.

In this seventh embodiment, the first member 1 is a round tubular member circular in cross-section provided, in its inner portion, with an axially extended wall portion 4 having a +(plus)-shape in cross-section and four hollow portions 3, 3, 3, and 3 which is a quarter circular in cross-section and partitioned by the partition wall portion 4. The structure of the first member 1 will be detailed as follows.

In this first member 1, two pairs of opposing members of its circumferential wall portion are connected by the partition wall portion 4 which is +(plus)-shape in cross-section. Also, the partition wall portion 4 is integrally formed with the first member 1.

The mandrel 18 of the joining device 10 used for this joining method is circumferentially divided into four segments centering on the wedge portion 19. Therefore, the mandrel 18 is formed by combining four mandrel segments 18a, 18a, 18a, and 18a, and the wedge portion 19 of the mandrel 18 is formed by combining four wedge portion segments 19a, 19a, 19a, and 19a. The die 11 is divided into four segments centering on the wedge hole portion 14.

Next, the joining method of the seventh embodiment will be explained.

First, the first member 1 is inserted into the insertion hole 6 of the second member 5 in a loosely fitted manner. Further, at a position of each hollow portion 3 of the first member 1 corresponding to the second member 5, a die segment 11a of the die 11 is inserted one by one. Furthermore, in each hollow portion 3 of the first member 1, the wedge portion segment 19a of the mandrel segment 18a of the mandrel 18 is disposed one by one.

Next, as shown in the same figure in a state in which the partition wall portion 4 is held by and between the wedge portion segments 19a and 19a disposed in two adjacent hollow portions 3 and 3 via the partition wall portion 4 of the first member 1, the wedge portion segments 19a, 19a, 19a, and 19a are simultaneously moved in the axial direction of the first member 1 to simultaneously insert each wedge portion segments 19a into the wedge hole portion segment 14a of the corresponding die segment 11a. As a result, each die segment 11a of the die 11 is moved radially outward of the first member 1 to thereby execute the expansion work of the inserted portion 2a of the first member 1 inserted into the insertion hole 6 and both portions 2b and 2b axially adjacent to the inserted portion 2a. The other steps are the same as those of the joining method of the aforementioned first embodiment.

The joined structure A7 of the seventh embodiment is obtained following the aforementioned steps.

Several embodiments of the present invention were explained above, but the present invention is not limited to the aforementioned embodiments.

For example, in the present invention, the cross-section of the first member 1 is not limited to a quadrilateral shape, and for example, can be other shapes, such as, e.g., a pentagonal shape, a hexagonal shape, a heptagonal shape, or an octagonal shape, or can be a circular shape as shown in FIGS. 16 and 17, or can be an ellipse shape.

Also, the shape of the second member 5 is not limited to a circular disc shape, and can be, for example, an angular plate-like shape or a tubular shape.

In the present invention, on the peripheral surface of the insertion hole 6 of the second member 5, grooves (e.g., knurled grooves) for improving the joint strength by increasing the friction force can be formed, or biting protrusions or dented portions can be formed.

Furthermore, in the present invention, considering the fact that when inserting the wedge portion 19 of the mandrel 18 into the wedge hole portion 14 of the die 14, a frictional force due to the sliding occurs between the surface of the wedge portion 19 and the peripheral surface of the wedge hole portion 14, a treatment for decreasing the frictional force can be made on at least one of the surface of the wedge portion 19 and the circumferential surface of the wedge hole portion 14. The examples of such treatment include application of lubricant on at least one of the surface of the wedge portion 19 and the circumferential surface of the wedge hole portion 14, and surface treatment, such as, e.g., nitriding treatment, hard anodic oxidation coating, or DLC treatment. Also, in the present invention, on the contacting surface (sliding surface) of the wedge portion segment 19a of the mandrel 18 and the partition wall portion 4 of the first member 1, a treatment for decreasing the frictional force can be made.

EXAMPLES

Next, concrete examples of the present invention will be explained. It should be noted that the present invention is not limited to these examples.

Examples

A joint structure A1 shown in the FIGS. 1 and 2 was produced by joining the first member 1 and the second member 5 in accordance with the joining method of the first embodiment shown in FIGS. 1 to 9.

The material of the first member 1 was aluminum alloy of JIS (Japanese Industrial Standards) A6N01-T5. Also, the length of the first member 1 was 200 mm, the size of the cross-section (outer diameter) was 78×78 mm, the curvature radius of the corner portion 1b was 20 mm, and the thickness of the flat wall portion 1a and that of the corner portion 1b was 2 mm. The thickness of the partition wall portion 4 was 2 mm.

The material used for the second member 5 was the same as the first member 1. Also, for the second member 5, the diameter was 130 mm, the cross-sectional size of the insertion hole 6 was 80×80 mm, the curvature radius of the corner portion 7 was 22 mm, and the thickness was 10 mm.

Also, in the joint structure A1, the protruded height of both portions 2b and 2b axially adjacent to the inserted portion 2a of the first member 1 inserted in the insertion hole 6 was 3 mm, and the width was 15 mm.

In the partition wall portion 4 of the first member 1 of the joined structure A1, no bending due to the expansion work was found. Therefore, it is confirmed that the joined structure A1 has high bending strength.

Comparative Example

The first member 1 and the second member 5 were joined in the same manner as in the aforementioned Example except that an angular tubular member with no partition wall portion was used.

The material and the size of the first member used were the same as those of the aforementioned Example except that the first member did not have a partition wall portion.

The material and the size of the second member used were the same as those of the second member 5 of Example.

[Comparison of Twisting Strength]

The twisting strength of the joint structure A1 of Example and the twisting strength of the joint structure of Comparative Example were compared. The twisting strength was measured in the following manner.

A load in the circumferential direction of the first member 1 was applied to the second member 5 with the first member 1 fixed. The torque measured when the second member 5 was rotated by 0.5 degrees in the circumferential direction of the first member 1 was defined as the twisting strength.

According to the result, the twisting strength of the joined structure A1 of Example was the same as that of the joined structure of Comparative Example.

[Comparison of Pull Out Strength]

The pull out strength of the joined structure A1 of Example and the pull out strength of the joined structure of Comparative Example were compared. The pull out strength was measured as follows.

A load in the axial direction of the first member 1 was applied to the second member 5 with the first member 1 fixed. The load measured when the second member 5 was displaced by 0.5 mm in the axial direction of the first member 1 was defined as the pull out strength.

As a result, the pull out strength of the joined structure A1 of Example was equivalent to that of the joined structure of Comparative Example.

From the above comparative results of the twisting strength and the pull out strength, it was confirmed that, even if the first member 1 has a partition wall portion 4, the first member 1 and the second member 5 can be firmly joined in the same manner as in the first member with no partition wall portion.

This application claims priority to Japanese Patent Application No. 2006-111087 filed on Apr. 13, 2006, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The present invention can be applied to a joining method and a joining device for joining members used as, for example, piping or parts, such as, e.g., a steering support beam, a steering column holder, a muffler, a frame, a propeller shaft, a suspension arm, other parts for an automobile, or products other than automobiles.

What is claimed is:

1. A joining method for joining a first member and a second member, wherein, using the first member which is a tubular member having an axially extended partition wall portion and a plurality of hollow portions partitioned by the partition wall portion and the second member having an insertion hole into which the first member is to be inserted, in a state in which the first member is inserted into the insertion hole of the second member, an expansion work of an inserted portion of the first member inserted in the insertion hole and both portions of the first member axially adjacent to the inserted portion is executed to thereby join the first member and the second member, characterized in that
using a mandrel having a wedge portion divided into a plurality of wedge portion segments centering on the wedge portion, and a die having a wedge hole portion corresponding to the wedge portion of the mandrel and divided into a plurality of die segments in a circumferential direction centering on the wedge hole portion,
in each hollow portion of the first member, the die segments of the die and the wedge portion segments of the mandrel are disposed, and then, in a state in which the partition wall portion is held by and between the wedge portion segments disposed in the two adjacent hollow portions via the partition wall portion of the first member, each wedge portion segment is simultaneously inserted into a wedge hole portion segment of the corresponding die segment to move each die segment radially outward of the first member to thereby execute the expansion work.

2. The joining method for joining members as recited in claim 1, wherein the first member is a tubular member polygonal in cross-section, and wherein the insertion hole of the second member is formed into a cross-sectional shape corresponding to a cross-section shape of the first member.

3. The joining method for joining members as recited in claim 1, wherein the first member is a tubular member quadrilateral in cross-section and its widthwise middle portions of at least a pair of opposing flat wall portions among four flat wall portions of the first member are connected by the partition wall portion, and
wherein the die is divided at a position corresponding to the widthwise middle portion of each flat wall portion of the first member, and
wherein the insertion hole of the second member is formed into a cross-sectional shape corresponding to a cross-sectional shape of the first member, and
wherein each die segment is moved radially outward of the first member toward each corner portion of the first member to execute the expansion work.

4. The joining method for joining members as recited in claim 2 or 3, wherein a corner portion of the first member is formed into a generally circular arc shape in cross-section.

5. The joining method for joining members as recited in claim 1, wherein the die has, on its outer peripheral surface, two protruded portions for outwardly locally expanding both portions of the first member axially adjacent to the inserted portion of the first member inserted in the insertion hole.

6. The joining method for joining members as recited in claim 1, wherein the second member is, on its circumferential edge portion of the insertion hole, integrally provided with a plate portion protruded in an axial direction of the first member, and
wherein the expansion work is executed in a state in which the plate portion of the second member is disposed on the outer peripheral surface of the first member in a fitted manner and a restraining member disposed on an outer surface side of the plate portion prevents the plate portion from rolling up from the outer peripheral surface of the first member.

7. A joined structure in which a first member which is a tubular member having an axially extended partition wall portion and a plurality of hollow portions partitioned by the partition wall portion and a second member having an insertion hole into which the first member is to be inserted are joined, characterized in that
in a state in which the first member is inserted into the insertion hole of the second member, an expansion work of an inserted portion of the first member inserted in the insertion hole and both portions of the first member axially adjacent to the inserted portion is executed, whereby the first member and the second member are joined.

8. The joined structure as recited in claim 7, wherein the first member is a tubular member polygonal in cross-section, and wherein the insertion hole of the second member is formed into a cross-sectional shape corresponding to a cross-section shape of the first member.

9. The joined structure as recited in claim 7, wherein the first member is a tubular member quadrilateral in cross-section and its widthwise middle portions of at least a pair of opposing flat wall portions among four flat wall portions of the first member are connected by the partition wall portion,
wherein the insertion hole of the second member is formed into a cross-sectional shape corresponding to a cross-section shape of the first member, and
wherein at least each corner portion of the inserted portion of the first member inserted in the insertion hole and both portions of the first member axially adjacent to the inserted portion are expanded.

10. The joined structure for members as recited in claim 8 or 9, wherein a corner portion of the first member is formed into a generally circular arc shape in cross-section.

11. The joined structure for members as recited in claim 7, wherein both portions of the first member axially adjacent to the inserted portion of the first member inserted in the insertion hole are expanded locally outward.

12. The joined structure for members as recited in claim 7, wherein a peripheral edge portion of the insertion hole of the second member is integrally provided with a plate portion protruded in an axial direction of the first member, and
wherein, in a state in which the plate portion of the second member is disposed on an outer peripheral surface of the first member in a fitted manner, an annular restraining member for preventing the plate portion from rolling up from an outer peripheral surface of the first member is outwardly fitted on outer surface side of the plate portion.

13. A joining device for joining a first member which is a tubular member having an axially extended partition wall portion and a plurality of hollow portions partitioned by the partition wall portion and a second member having an insertion hole by expanding an inserted portion of the first member inserted in the insertion hole of the second member and both portions of the first member adjacent to the inserted portion of the first member in a state in which the first member is inserted in the insertion hole of the second member, the joining device comprises:
an expanding mandrel having a wedge portion circumferentially divided into a plurality of wedge portion segments centering on the wedge portion; and
an expanding die having a wedge hole portion corresponding to the wedge portion of the mandrel, the die circumferentially being divided into a plurality of die segments centering on the wedge hole portion,
wherein each die segment of the die is configured to be disposed in each hole portion of the first member, and
wherein each wedge portion segment of the mandrel is configured to be inserted into a wedge hole portion segment of the die segment disposed in each hole portion of the first member to move each die segment radially outward of the first member.

14. The joining device as recited in claim 13, wherein the die has, on its outer peripheral surface, two protruded portions for outwardly locally expanding both portions of the first member axially adjacent to the inserted portion of the first member inserted in the insertion hole.

* * * * *